United States Patent Office 2,870,144
Patented Jan. 20, 1959

2,870,144

3-FURFURYLIDENE-AMINO-1,2,4-TRIAZOLE AND PROCESS FOR PRODUCING SAME

Werner Schäfer, Koln-Stammheim, Richard Wegler, Leverkusen, and Ludwig Eue, Koln-Mulheim, Germany, assignors to Farbenfabriken Bayer Aktiengesellschaft, Leverkusen, Germany, a corporation of Germany No Drawing. Application November 18, 1957
Serial No. 696,907

Claims priority, application Germany December 17, 1956

1 Claim. (Cl. 260—240)

The present invention relates to and has as its objects the new and useful 3-furfurylidene-amino-1.2.4-triazole of the following formula

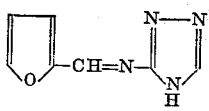

3-amino-1.2.4-triazole is known to be effective for the control of the growth of plants. In accordance with the present invention it has now been found that an even more effective compound in this series is the furfurylidene derivative of the aforementioned 3-amino-1.2.4-triazole. Especially when used as a defoliant in the cotton field the defoliation starts much earlier when using 3-furfurylidene-amino-1.2.4-triazole. Also the defoliage thus achieved is much better.

The preparation of the hitherto not described 3-furfurylidene-amino-1.2.4-triazole is carried out in a usual manner. Thus, equimolecular quantities of furfurol and 3-amino-1.2.4-triazole may be reacted especially in the presence of a suitable inert organic solvent such as methanol, ethanol and the like. The average yield in this reaction amounts to more than 90% of the theoretical.

The 3-furfurylidene-amino-1.2.4-triazole may be used in the same way as amino-triazole itself, that means preferably in admixture with solid or liquid inert substances and also, if desired, with wetting agents, emulsifiers, dispersing agents, agents promoting penetration, fertilizers and/or other herbicides.

The following example is given for the purpose of illustrating the special utility: 3-amino-1.2.4-triazole and 3-furfurylidene-amino-1.2.4-triazole were used in a field test for the defoliation of ripe cotton shortly before the harvest at concentrations of 0.5, 0.2 and 1% respectively. The spray is prepared with the addition of water and an emulsifier (a polyglycolether of benzylhydroxydiphenyl). In order to ensure a uniform wetting of all plants, 1200 litres per hectare were employed. The result of this treatment is listed in the following table:

| agent | conc., percent | defoliage in 1% | | |
|---|---|---|---|---|
| | | after 5 days | 7 days | 9 days |
| aminotriazole | 0.5 | start | 40 | 40 |
| | 0.2 | start | 35–40 | 40 |
| | 0.1 | start | 35–40 | 40 |
| furfurylidene-amino-triazole | 0.5 | 50 | 90 | 90 |
| | 0.2 | 35–40 | 60 | 60 |
| | 0.1 | 35–40 | 40 | 50 |

Compared with the amino-triazole, 3-furfurylidene-amino-triazole shows an improved and faster defoliating effect, although the new compound contains only 51% of amino-triazole (by weight). Furfurol has been proven to have no effect whatever in this direction. The effect achieved is thus not additive but potentiated.

The following example illustrates the possibilities of how to prepare the inventive compound, without, however, restricting the present invention thereto.

*Example*

9 parts by weight of 3-amino-1.2.4-triazole are dispersed in 35 parts by volume of methanol. The mixture is heated to 40° C. and 9.6 parts by weight of furfurol are added while keeping the temperature between 40 to 50° C., if necessary by external cooling. The reaction mixture is kept for further 1 hour at 50° C., then it is cooled down and the 3-furfurylidene-amino-1.2.4-triazole is collected by filtration. The crude 3-amino-1.2.4-triazole is washed with 5.5 parts by volume of methanol and then dried at 50° C. Yield: 14 parts by weight, i. e. 86% of the theoretical. The crude product is almost pure and melts at 189 to 190° C.

We claim:

3-furfurylidene-amino-1.2.4-triazole.

No references cited.